United States Patent
Stewart

(10) Patent No.: US 7,640,786 B2
(45) Date of Patent: Jan. 5, 2010

(54) SELF-CALIBRATING ACCELEROMETER

(75) Inventor: Robert E. Stewart, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 462 days.

(21) Appl. No.: 11/729,007

(22) Filed: Mar. 28, 2007

(65) Prior Publication Data

US 2008/0236242 A1    Oct. 2, 2008

(51) Int. Cl.
*G01P 21/00* (2006.01)

(52) U.S. Cl. ........................................ 73/1.38
(58) Field of Classification Search .......... None
See application file for complete search history.

(56) References Cited

U.S. PATENT DOCUMENTS

| | | | |
|---|---|---|---|
| 3,241,355 A * | 3/1966 | Mclean | 73/1.38 |
| 6,435,000 B1 * | 8/2002 | Takahashi et al. | 73/1.38 |
| 7,150,191 B2 * | 12/2006 | Foote et al. | 73/514.29 |
| 2003/0200807 A1 * | 10/2003 | Hulsing, II | 73/514.01 |
| 2004/0045354 A1 * | 3/2004 | Lentner et al. | 73/504.04 |

\* cited by examiner

*Primary Examiner*—Robert R Raevis
(74) *Attorney, Agent, or Firm*—Carmen Patti Law Group, LLC

(57) ABSTRACT

The method and apparatus in one embodiment may have: a sensing element for an accelerometer having a bias, the sensing element having a rectangular plate supported by flexures which allow rotation about a transverse center line thereof; a center of mass (CG) of the sensing element having two stable positions, one on each side of an axis of rotation defined by a centerline of suspension; a secondary mass within a proof-mass translates in-plane to move the center of mass to thereby effect a self-calibration mechanization that continuously measures and nulls the accelerometer's bias under dynamic operating conditions.

20 Claims, 6 Drawing Sheets

SELF-CALIBRATING ACCELEROMETER

CROSS-REFERENCE TO RELATED APPLICATIONS

This application contains subject matter that is related to the subject matter of the following applications, which is assigned to the same assignee as this application.

"Bias and Quadrature Reduction in Class II Coriolis Vibratory Gyros", Ser. No. 11/499,957, filed Aug. 7, 2006.

"Method for Modifying the Location of Nodal Points of a Vibrating Beam", Ser. No. 11/499,956, filed Aug. 7, 2006.

"Oscillation of Vibrating Beam in a First Direction for a First Time Period and a Second Direction for a Second Time Period to Sense Angular Rate of the Vibrating Beam," by Robert E. Stewart, application Ser. No. 11/057,324, filed Feb. 11, 2005.

"Coplanar Proofmasses Employable To Sense Acceleration Along Three Axes", Ser. No. 11/010,588, filed Dec. 13, 2004.

"Self-Calibration For An Inertial Instrument Based On Real Time Bias Estimator", Ser. No. 11/364,316, filed Feb. 28, 2006.

TECHNICAL FIELD

The invention relates generally to accelerometers and more particularly to self-calibrating accelerometers.

BACKGROUND

In the case of the gyro, a specific class of gyro was identified in which the gyro bias reversed polarity when the drive and sense axes were interchanged. This particular class of gyro was identified as Class II Coriolis Vibratory Gyro and is characterized by being inherently counterbalanced, symmetrical about the input axis and having orthogonal degenerate vibration modes. Self calibration of the gyro bias is achieved by employing two gyros to measure the angular rate and sequentially reversing the gyro bias. The sequence of data from the gyros may be processed in an algorithm to solve for the gyro biases and subtract them from the measured rate. The two self-calibrated gyro angular rate measurements are averaged to reduce the angle random walk.

Self-calibration of accelerometer bias can be achieved in a manor similar to the self-calibration of gyro bias. In the case of the accelerometer the polarity of the scale factor is reversed. A method for reversing the scale factor polarity of an accelerometer is shown in U.S. Pat. No. 4,599,896, "High Accuracy Accelerometer". Self-calibration of accelerometer bias is achieved by employing two accelerometers to measure the acceleration and sequentially reverse the accelerometer scale factor. The polarity of the accelerometer bias remains unchanged and the sequence of data from the accelerometers is processed in the previously disclosed algorithm to solve for the accelerometer biases and subtract them form the measured acceleration. The two self-calibrated accelerometer acceleration measurements are averaged to reduce the velocity random walk.

Accelerometer bias uncertainty is a major source of error in inertial measurement and navigation systems. Bias uncertainty arises due to transient behavior at turn on, non-modelablity and instability of bias versus temperature characteristics including hysteresis and simply trend over time. Reduction or elimination of accelerometer bias uncertainty would significantly improve the performance of inertial measurement and navigation systems.

There is a need in the art for improved self-calibrating accelerometers.

SUMMARY

One embodiment of the present method and apparatus encompasses an apparatus. The apparatus may comprise: a sensing element for an accelerometer having a bias, the sensing element having a rectangular plate supported by flexures which allow rotation about a transverse center line thereof; a center of mass (CG) of the sensing element having two stable positions, one on each side of an axis of rotation defined by a centerline of suspension; a secondary mass within a proofmass translates in-plane to move the center of mass to thereby effect a self-calibration mechanization that continuously measures and nulls the accelerometer's bias under dynamic operating conditions.

Another embodiment of the present method and apparatus encompasses a method. The method may comprise: continuously self-calibrating an accelerometer bias under both static and dynamic conditions to thereby remove accelerometer bias as an error source; successively and simultaneously measuring acceleration by two accelerometers with sequentially alternating polarities; and processing the measured acceleration from the outputs of the accelerometers in a digital signal processor using a real time bias estimator algorithm to thereby effect the bias self-calibration.

DESCRIPTION OF THE DRAWINGS

The features of the embodiments of the present method and apparatus are set forth with particularity in the appended claims. These embodiments may best be understood by reference to the following description taken in conjunction with the accompanying drawings, in the several figures of which like reference numerals identify like elements, and in which:

DETAILED DESCRIPTION

Various related art for use with embodiments of the present method and apparatus is disclosed in the following documents.

Outputs of accelerometers may be processed in a digital signal processor using a real time bias estimator algorithm described in Ser. No. 11/364,316, filed Feb. 28, 2006.

X, Y and Z sensing elements may be arranged to form an orthogonal set as described in Ser. No. 11/010,588, filed Dec. 13, 2004. Also, a MEMS three axis planar accelerometer is described in Ser. No. 11/010,588, filed Dec. 13, 2004.

The principle of mass modulation is described in patent disclosure 001234-199.

A proofmass being electrostatically force rebalanced using a pulse width modulated, charge control, servo is described in U.S. Pat. No. 5,142,921. An actuation method is described in U.S. Pat. No. 6,591,027 for a "Bi-stable Micro Actuator and Optical Switch". The principle of mass modulation is also described in U.S. Pat. No. 4,599,896 High Accuracy Accelerometer.

The following describes one embodiment for a self-calibrating accelerometer. While embodiments according to the present method and apparatus may be implemented as a single accelerometer, a three axis planar accelerometer configuration is described as one embodiment. This self-calibration mechanization continuously measures and nulls the accelerometer's bias under dynamic operating conditions. It is to be understood that the embodiments of the present method and apparatus may also be utilized in a single axis planar accelerometer configuration.

Figure 1:
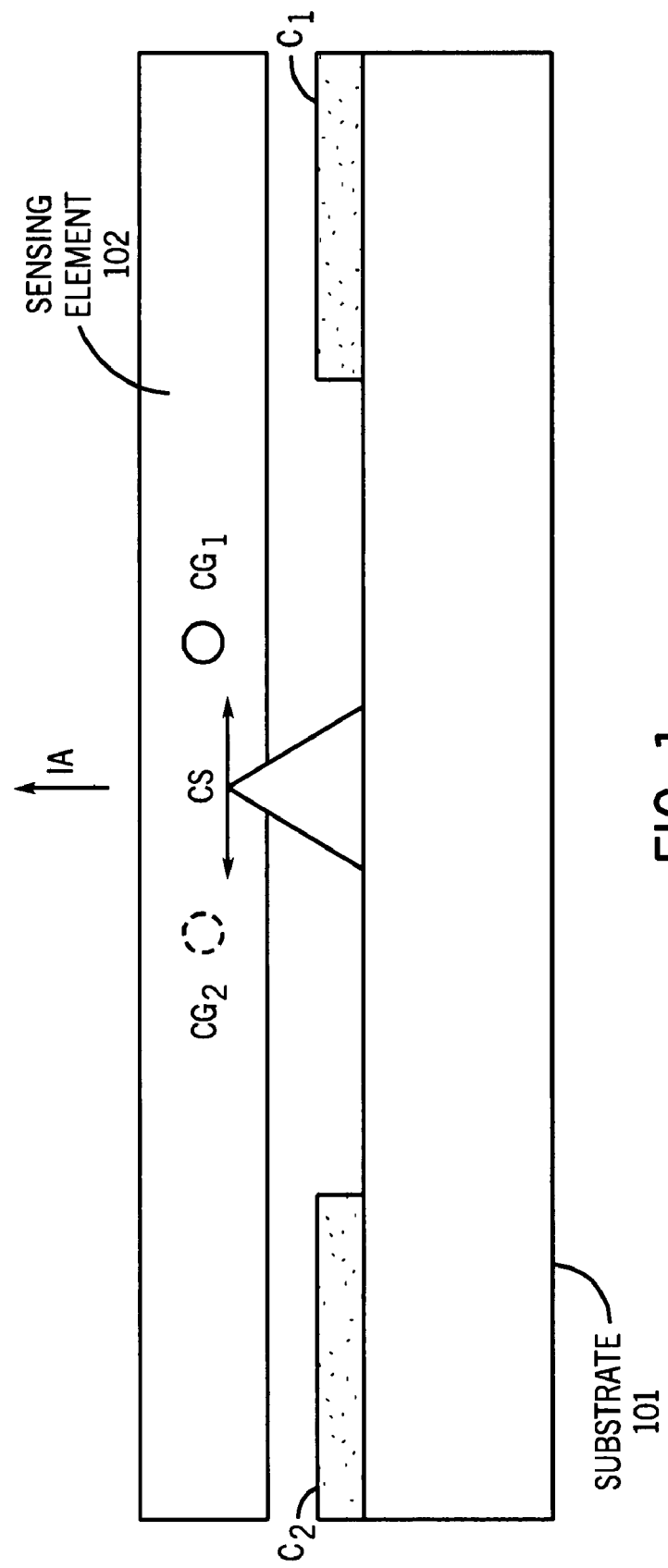
FIG. 1 is a schematic diagram of one embodiment of a self-calibrating accelerometer according to the present method and apparatus.

FIG. 1 is a schematic diagram of one embodiment of a self-calibrating accelerometer that may have a Z axis with its sensitive or input axis (IA) normal to the plane of the of the sensing element 102. The sensing element 102 may be a rectangular plate supported by flexures which allow rotation about a transverse center line. The apex of the triangle 103 depicts this centerline of suspension (CS) as a fulcrum supported by a substrate 101. The center of mass (CG) of the sensing element 102 is shown as having two stable positions, one on each side of the axis of rotation defined by the centerline of suspension. A secondary mass within the proofmass translates in-plane to move the center of mass right and left. This mechanization is described in more detail below. The ability to change the location of the center of mass is called mass modulation. Relocating the center of mass from one side of the centerline of suspension to the other reverses the polarity of the input axis and enables self-calibration of accelerometer bias. Under acceleration the sensing element rotates clockwise about the centerline of support (CS) with the center of mass in the CG1 position and counter clockwise with the center of mass in the CG2 position. The proofmass may be electrostatically force rebalanced using, for example, a pulse width modulated, charge control, servo.

Figure 2:
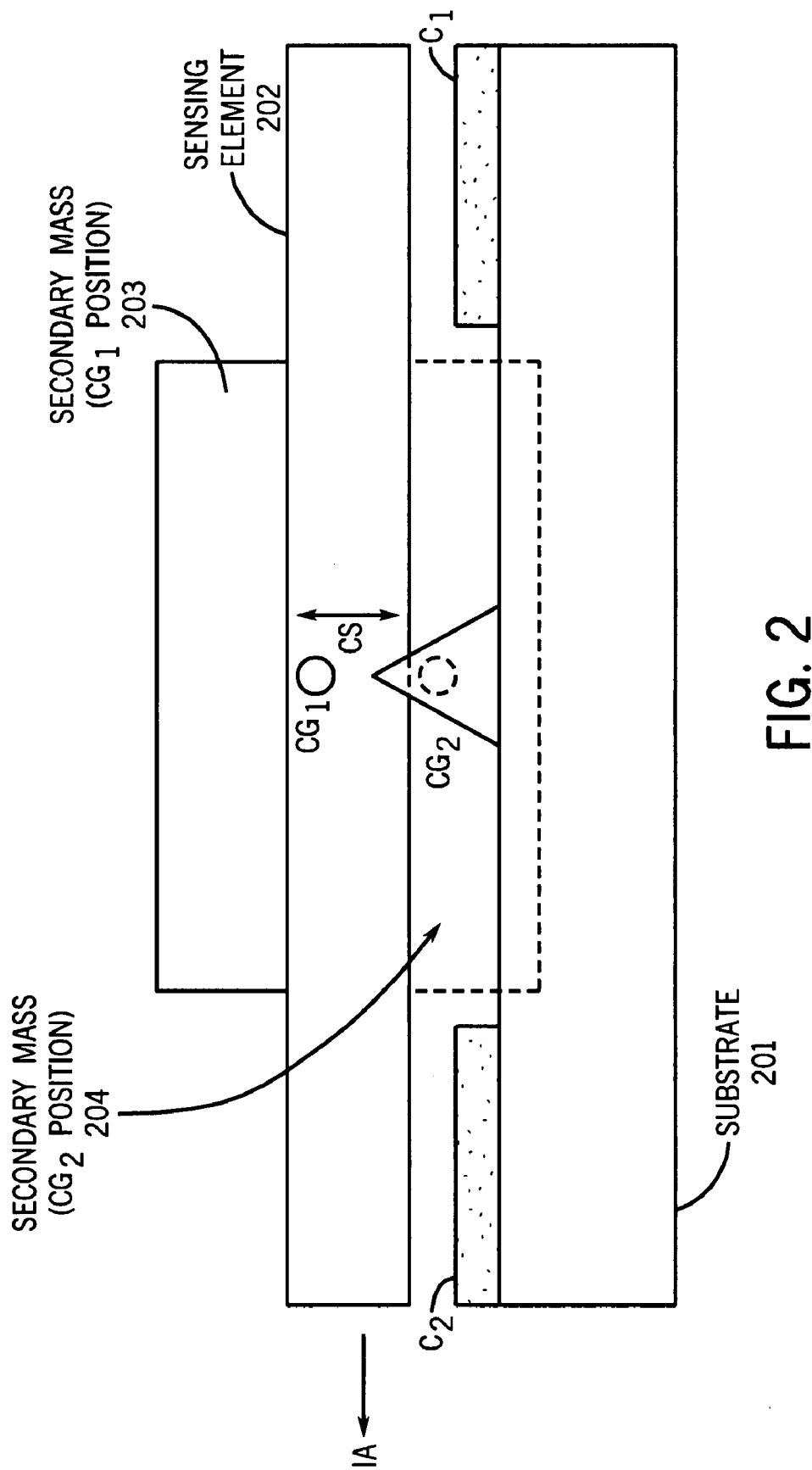
FIG. 2 is a schematic diagram of another embodiment of a self-calibrating accelerometer according to the present method and apparatus.

FIG. 2 is a schematic diagram of another embodiment of a self-calibrating accelerometer having X and Y axis with its sensitive or input axis (IA) in-plane. To change the polarity of the accelerometer, the centers of mass (CG1, and CG2), in this case, may be moved vertically between two bistable positions above and below the centerline of suspension (CS) for the sensing element 202. That is, this is accomplished by translating the secondary mass up and down out-of-plane. The electrostatic force rebalance servo functions in the same manner as described above for the Z axis configuration.

Historically, bias stability and repeatability over time and temperature have been the most difficult accelerometer performance requirements to meet. Embodiments according to the present method and apparatus for the self-calibrating accelerometer alleviate this difficulty by continuously self-calibrating the accelerometer bias under both static and dynamic conditions and thereby remove accelerometer bias as an error source. Bias self-calibration requires successive simultaneous measurements of acceleration by two accelerometers with sequentially alternating polarities. The outputs of the accelerometers may be processed in a digital signal processor using the real time bias estimator algorithm described in patent disclosure 000856-199. The alternating polarity reversal is accomplished by alternating the location of the center of mass of the sensing element to opposite sides of the centerline of support as noted earlier.

Figure 3:
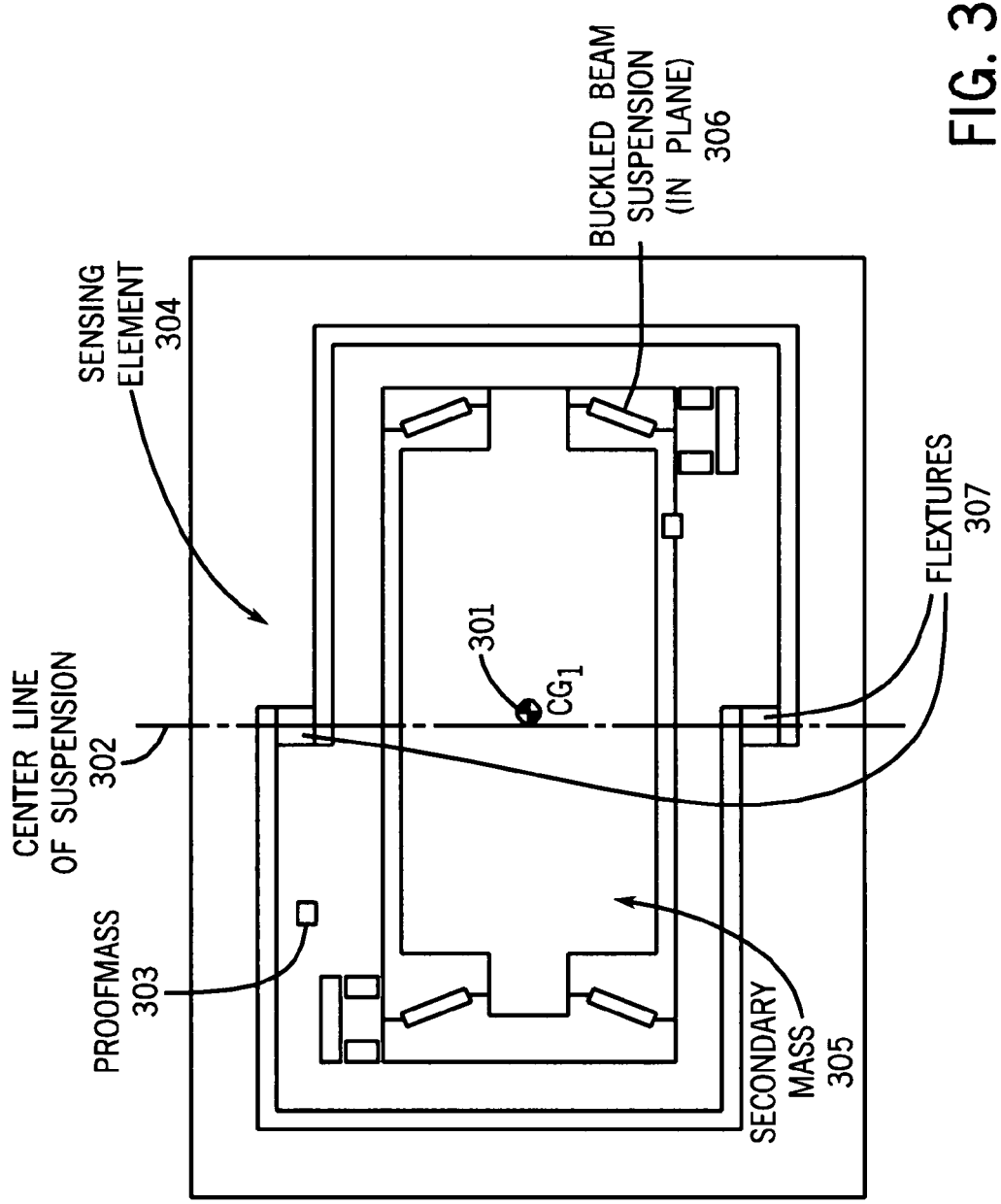
FIG. 3 is a plan view of the Z axis sensing element according to the present method and apparatus.

FIG. 3 is a plan view of the Z axis sensing element 304 according to the present method and apparatus. The sensing element 304 may be a proofmass 303 supported by flexures 307 to the sensing element 304 about a center line of suspension 302. Within the proofmass 303 is a secondary mass 305 shown in one of two bistable positions. The secondary mass 305 is supported by four buckled flexure elements 306 that are held in compression. Thermal actuators (not shown) momentarily reduce the compressive force below the critical buckling force causing the secondary mass 305 to translate to the other bistable position. The input axis is normal to the plane of the sensing element and the rotational response of the proofmass to acceleration is reversed while non-acceleration induced torques on the sensing element do not reverse as the center of mass translates between the two bistable positions.

Figure 4:
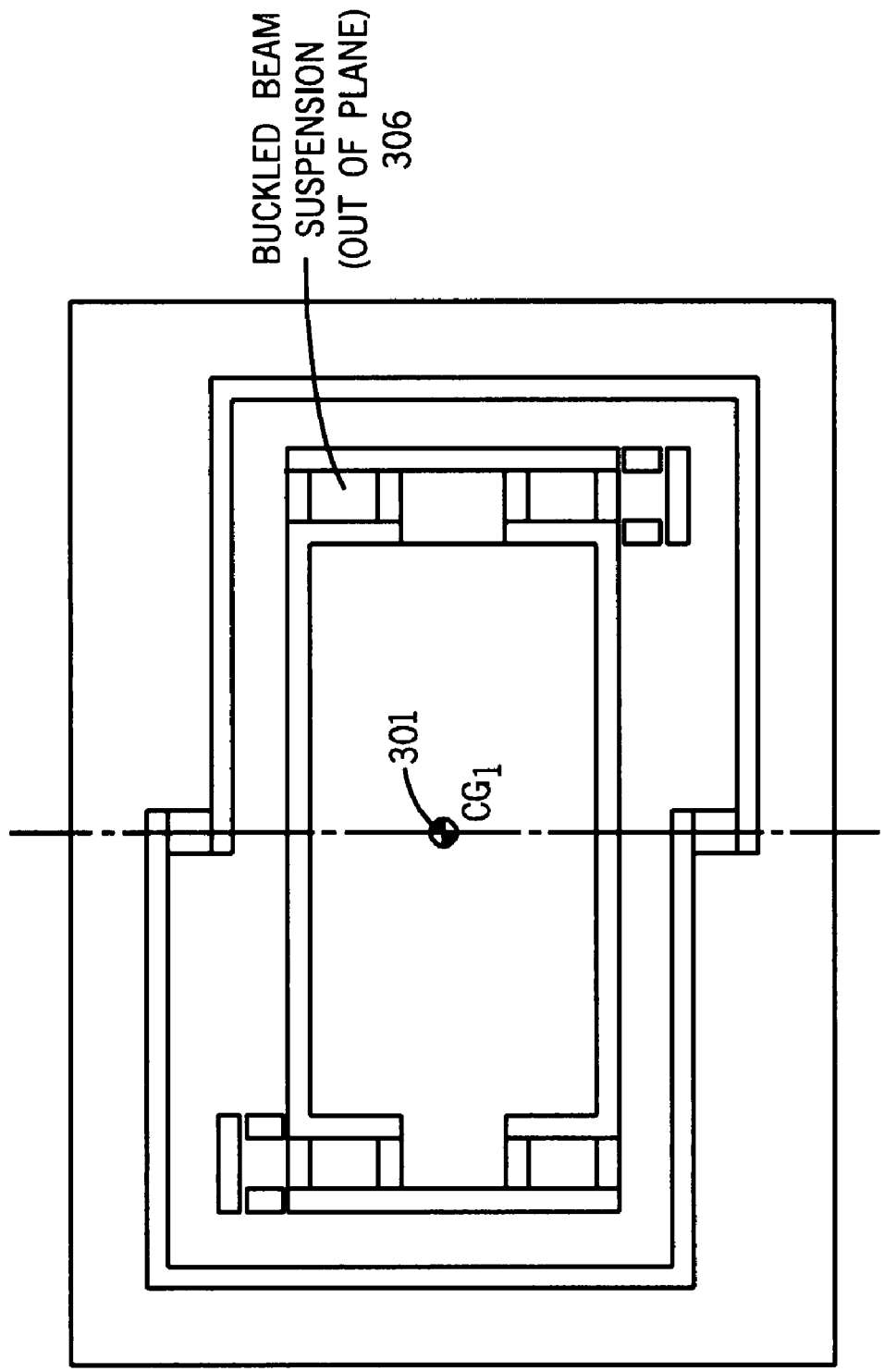
FIG. 4 is a plan view of the X and Y axes sensitive element according to the present method and apparatus.

FIG. 4 is a plan view of the X and Y axes sensing element according to the present method and apparatus. The sensing element in FIG. 4 consists of the same components as the sensing element shown in FIG. 3. The secondary mass 305 within the proofmass 303 is supported by buckled beam flexures 306 which cause the two bistable positions of the secondary mass 305 to be above and below a neutral in-plane position. The center of mass $CG_1$ in this case is either above or below the center of support. The input axis is therefore in the plane of the sensing element 302 and normal to the plane containing the centerline of suspension and the center of mass.

Figure 5:
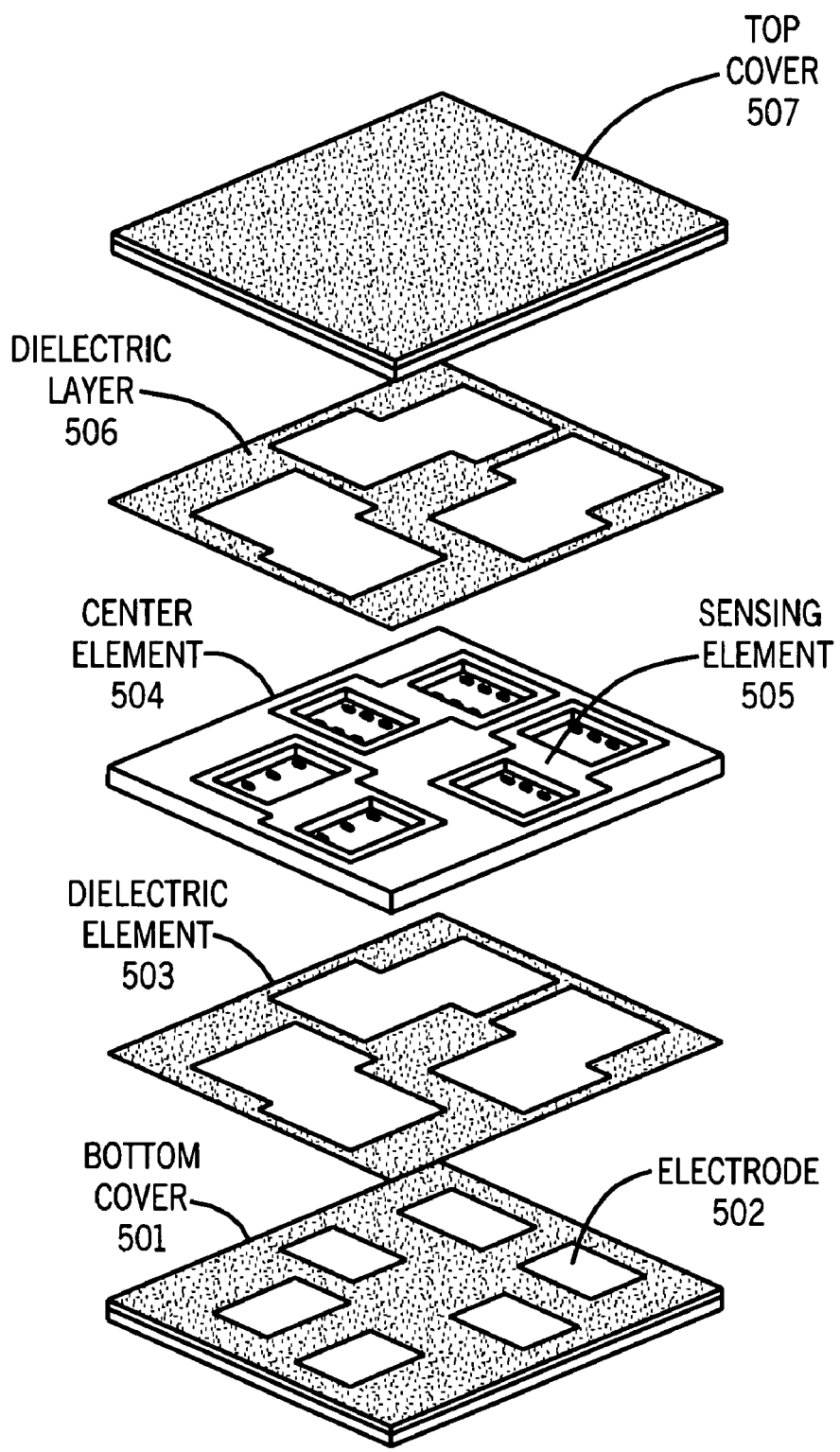
FIG. 5 is an exploded view of a MEMS three axis planar accelerometer according to the present method and apparatus.

FIG. 5 is an exploded view of a MEMS three axis planar accelerometer. In the depicted embodiment, three proofmass structures without mass modulated sensing elements 505 are shown. A pair of these three axis accelerometers with mass modulation are used to simultaneously measure acceleration along three orthogonal axes with alternating input axis polarity. The accelerometer outputs are applied to the real time bias estimator algorithm which determines and nulls the bias of each accelerometer. In this embodiment a bottom cover 501 is operatively coupled to a center element 504 via a dielectric layer 503. The center element 504 may have a proofmass 505. A top cover 507 may be operatively coupled to the center element 504 by another dielectric layer 506.

Figure 6:
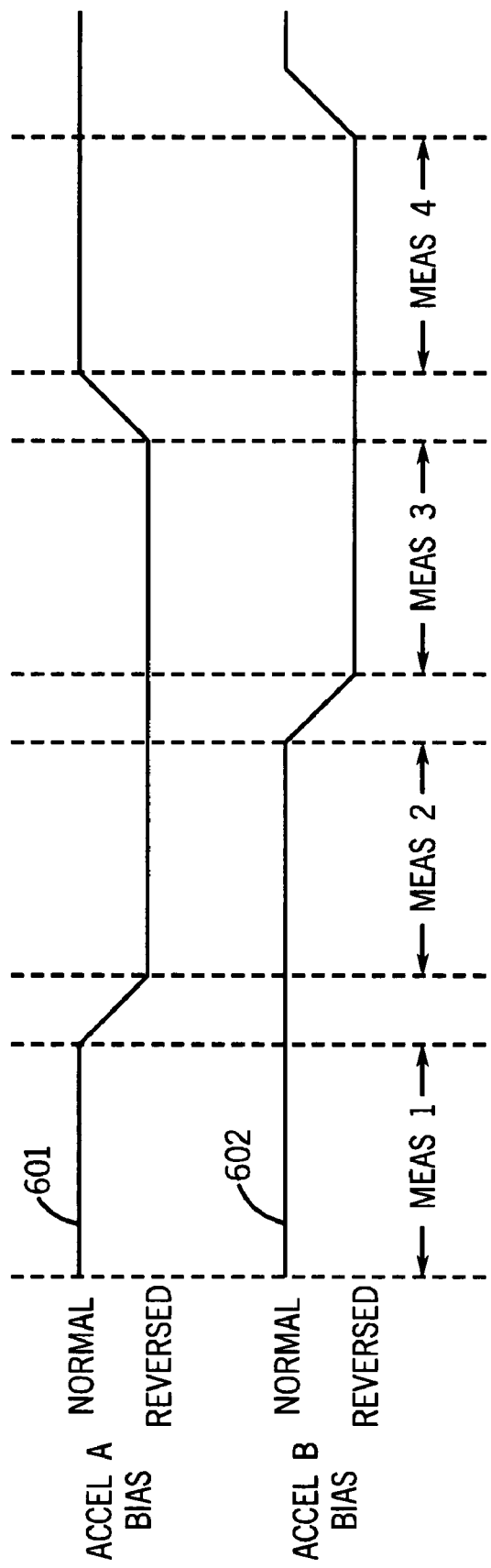
FIG. 6 depicts a timing sequence for accelerometer bias errors that may be directly observable if two accelerometers are operated in parallel.

FIG. 6 depicts a timing sequence for accelerometer bias errors that may be directly observable if two accelerometers are operated in parallel. One embodiment of a real time bias estimator algorithm is described as follows.

Accelerometer bias errors may be directly observable if two accelerometers are operated in parallel. Such a timing sequence would be as depicted in FIG. 6 for an accelerometer A with its associated bias 601 and an accelerometer B with its associated bias 602.

In this embodiment both accelerometers are operating stabilized over each of the measurement intervals Meas 1 through Meas 4. Both accelerometers are sensing accelerations along the same axis. The measurement made by each accelerometer (A and B) during each ith measurement interval is:

MeasA(i)=Win(i)+/−BiasA
MeasB(i)=Win(i)+/−BiasB
For the first and second intervals,
MeasA(1)=Win(1)+BiasA
MeasB(1)=Win(1)+BiasB
MeasA(2)=Win(2)−BiasA
MeasB(2)=Win(2)+BiasB $$\begin{pmatrix} MeasA(1) \\ MeasB(1) \\ MeasA(2) \\ MeasB(2) \end{pmatrix} = \begin{pmatrix} 1 & 0 & 1 & \\ 1 & 0 & & 1 \\ 0 & 1 & -1 & \\ 0 & 1 & & 1 \end{pmatrix} * \begin{pmatrix} Win(1) \\ Win(2) \\ BiasA \\ BiasB \end{pmatrix}$$

The observation matrix inverts to:

$$\begin{pmatrix} 0.5 & 0.5 & 0.5 & -0.5 \\ 0.5 & -0.5 & 0.5 & 0.5 \\ 0.5 & -0.5 & -0.5 & 0.5 \\ 0.5 & 0.5 & -0.5 & 0.5 \end{pmatrix}$$

The observation matrix yields an estimate for the inputs over each interval and the values of BiasA and BiasB over the measurement intervals 1 and 2. The additional measurements over intervals 3 and 4 provide an over-developed solution that can be utilized in a recursive filter to maintain a continuous estimate of bias in each accelerometer.

The present apparatus in one example may comprise a plurality of components such as one or more of electronic components, hardware components, and computer software components. A number of such components may be combined or divided in the apparatus.

The present method and apparatus are not limited to the particular details of the depicted embodiments and other modifications and applications are contemplated. Certain other changes may be made in the above-described embodiments without departing from the true spirit and scope of the present method and apparatus herein involved. It is intended, therefore, that the subject matter in the above depiction shall be interpreted as illustrative and not in a limiting sense.

I claim:

1. An apparatus, comprising:
   a sensing element for an accelerometer having a bias, the sensing element having a plate supported by flexures which allow rotation about a transverse center line thereof;
   a center of mass (CG) of the sensing element having two stable positions, one on each side of an axis of rotation defined by a centerline of suspension;
   a secondary mass within a proofmass translates in-plane to move the center of mass to thereby effect a self-calibration mechanization that continuously measures and nulls the accelerometer's bias under dynamic operating conditions.

2. The apparatus according to claim 1, wherein the secondary mass within the proofmass translates in-plane to move the center of mass right and left.

3. The apparatus according to claim 1, wherein the center of mass is relocated from one side of the centerline of suspension to the other side to thereby reverse a polarity of an input axis to enable self-calibration of accelerometer bias.

4. The apparatus according to claim 1, wherein under acceleration the sensing element is rotatable clockwise about a centerline of support (CS) with the center of mass in a first center of mass (CG1) position and counter clockwise with the center of mass in a second center of mass (CG2) position.

5. The apparatus according to claim 4, wherein to change polarity of the accelerometer, the centers of mass (CG1 and CG2) are vertically moveable between two bistable positions above and below a centerline of suspension (CS) of the sensing element.

6. The apparatus according to claim 5, wherein the secondary mass is translated up and down out-of-plane.

7. A method, comprising:
   continuously self-calibrating accelerometer bias under both static and dynamic conditions to thereby remove accelerometer bias as an error source;
   successively and simultaneously measuring acceleration by two accelerometers with sequentially alternating polarities; and
   processing the measured acceleration from the outputs of the accelerometers in a digital signal processor using a real time bias estimator algorithm to thereby effect the bias self-calibration.

8. The method according to claim 7, wherein the alternating polarity reversal is accomplished by alternating a location of a center of mass of a sensing element to opposite sides of a centerline of support of the sensing element.

9. The method according to claim 7, wherein the method further comprises translating a secondary mass within a proofmass in-plane to move a center of mass right and left.

10. The method according to claim 9, wherein the method further comprises relocating the center of mass from one side of the centerline of suspension to the other side to thereby reverse a polarity of an input axis to enable self-calibration of accelerometer bias.

11. The method according to claim 9, wherein the method further comprises, under acceleration, rotating the sensing element clockwise about a centerline of support (CS) with the center of mass in a first center of mass (CG1) position and counter clockwise with the center of mass in a second center of mass (CG2) position.

12. The method according to claim 11, wherein to change polarity of the accelerometer, the centers of mass (CG1 and CG2) are vertically moveable between two bistable positions above and below a centerline of suspension (CS) of the sensing element.

13. The method according to claim 12, wherein the secondary mass is translated up and down out-of-plane.

14. An apparatus, comprising:
   a sensing element in which a secondary mass is suspended within a proofmass of the sensing element for an accelerometer; and
   a pair of buckled beam flexures that suspend the secondary mass within the proofmass, the suspension allowing the secondary mass to be in one of two bi-stable positions;
   thereby effecting a self-calibration mechanization that continuously measures and nulls the accelerometer's bias under dynamic operating conditions.

15. The apparatus according to claim 14, wherein the apparatus further comprises thermal actuators that reduce compressive force in the buckled beams allowing the secondary mass to move from one position of the two bi-stable positions to the other position of the bi-stable positions.

16. The apparatus according to claim 14, wherein a secondary mass is translatable within the proofmass in-plane to move a center of mass right and left.

17. The apparatus according to claim 14, wherein the apparatus further comprises relocating a center of mass from one side of the centerline of suspension of the secondary mass to the other side to thereby reverse a polarity of an input axis to enable self-calibration of accelerometer bias.

18. The apparatus according to claim 14, wherein the apparatus further comprises, under acceleration, rotating the sensing element clockwise about a centerline of support (CS) with the center of mass in a first center of mass (CG1) position and counter clockwise with the center of mass in a second center of mass (CG2) position.

19. The apparatus according to claim 18, wherein to change polarity of the accelerometer, the centers of mass (CG1 and CG2) are vertically moveable between two bistable positions above and below a centerline of suspension (CS) of the sensing element.

20. The apparatus according to claim 19, wherein the secondary mass is translated up and down out-of-plane.

* * * * *